United States Patent
Gamble et al.

(10) Patent No.: US 7,121,770 B1
(45) Date of Patent: Oct. 17, 2006

(54) TOOL BODY AND CUTTING INSERT FOR METAL CUTTING OPERATIONS

(75) Inventors: Kevin M. Gamble, Stahlstown, PA (US); Thomas J. Long, II, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/151,024

(22) Filed: Jun. 13, 2005

(51) Int. Cl.
*B23C 5/10* (2006.01)

(52) U.S. Cl. .............................. 407/40; 407/30; 407/34

(58) Field of Classification Search ................. 407/33, 407/34, 30, 40, 53, 120; 175/420.1, 393; 76/108.2
See application file for complete search history.

(56) References Cited

U.S. PATENT DOCUMENTS

| | | |
|---|---|---|
| 1,535,028 A | 4/1925 | Muller |
| 1,891,789 A | 12/1932 | Wheeler |
| 2,061,581 A | 11/1936 | Lippincott |
| 3,327,746 A | 6/1967 | Andrus et al. |
| 3,860,051 A | 1/1975 | Anson |
| 4,311,175 A | 1/1982 | Drummond |
| 4,645,383 A | 2/1987 | Lindsay |
| 5,220,967 A * | 6/1993 | Monyak .................. 175/420.1 |
| 5,348,426 A * | 9/1994 | Krupp ........................ 407/40 |
| 5,452,628 A * | 9/1995 | Montgomery et al. ..... 76/108.2 |
| 5,996,714 A * | 12/1999 | Massa et al. ............... 175/413 |
| 6,044,920 A * | 4/2000 | Massa et al. ............... 175/417 |
| 6,915,867 B1 * | 7/2005 | Bise ........................ 175/420.1 |

* cited by examiner

*Primary Examiner*—Willmon Fridie, Jr.
(74) *Attorney, Agent, or Firm*—Larry R. Meenan

(57) ABSTRACT

A cutting tool body that is adapted for use in milling operations comprises at least one pocket for supporting a cutting insert. The pocket is defined, at least in part, by a cylindrical wall and a seating surface within the tool body. At least one passage is provided through the tool body for evacuating chips upward and away from the surface of a workpiece. The seating surface of the pocket extends radially inward from the cylindrical wall and intersects the passage through the tool body. At least one slot traverses the pocket to separate a part of the tool body into first and second portions, at least one of which is movable relative to the other for clamping the cutting insert into the pocket.

20 Claims, 3 Drawing Sheets

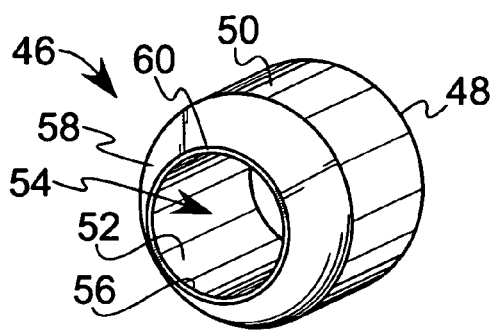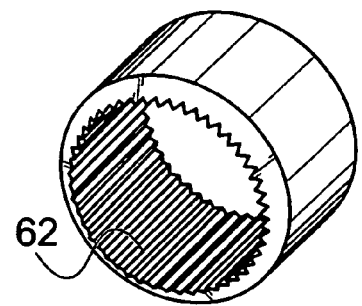
FIG. 6A　　　　　FIG. 6B
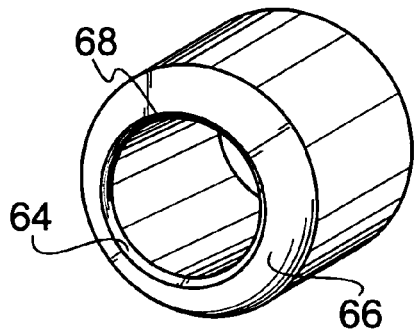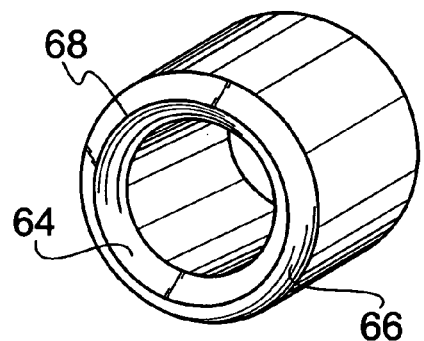
FIG. 7A　　　　　FIG. 7B
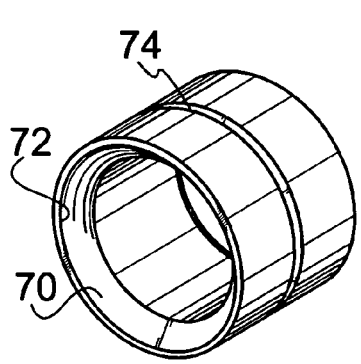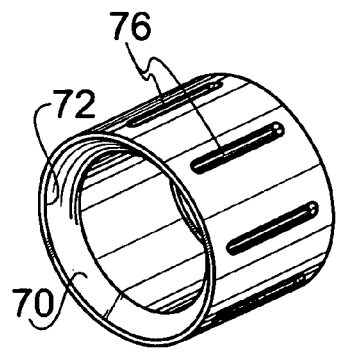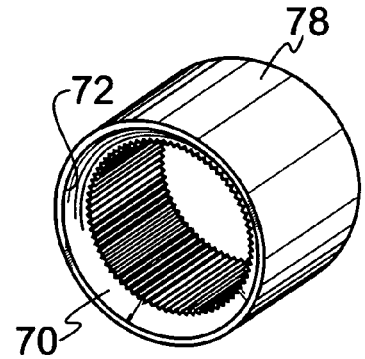
FIG. 8A　　　FIG. 8B　　　FIG. 8C
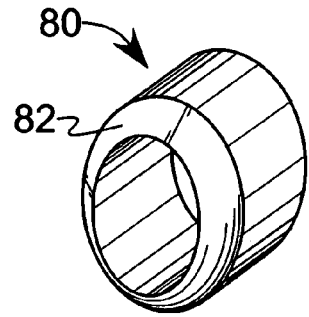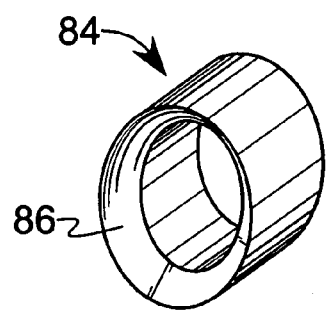
FIG. 9　　　　　FIG. 10

TOOL BODY AND CUTTING INSERT FOR METAL CUTTING OPERATIONS

BACKGROUND OF THE INVENTION

The present invention relates in general to cutting tools and, more particularly, to a tool body and inserts that are especially suitable for use in metal cutting operations.

Cutting tools for metal cutting operations are well known. A conventional metal cutting tool typically comprises a tool body that is adapted to mate with a cutting machine. The tool body has a working end and one or more pockets in the working end. A conventional pocket ordinarily includes a floor and two seating surfaces. The pockets are provided for receiving cutting inserts. A retention screw threaded into a threaded hole in the tool body holds the insert in the pocket.

Conventional metal cutting tools are adapted for use in removing material from a metal workpiece. The material removed is commonly referred to as a chip. Chips are often deposited on the workpiece and subsequently re-cut by the cutting inserts, resulting in damage to the cut surface of the workpiece.

What is needed is a metal cutting tool that prevents or reduces the risk of chips being deposited on a metal workpiece.

BRIEF SUMMARY OF THE INVENTION

Generally speaking, the invention is directed to a cutting tool body that is adapted for use in metal cutting operations. The tool body comprises at least one pocket for supporting a cutting insert. The pocket is defined, at least in part, by a cylindrical wall and a seating surface within the tool body. At least one passage extends through the tool body. The seating surface extends radially inward from the cylindrical wall and intersects the passage. At least one slot in the tool body traverses the pocket to separate a part of the tool body into first and second portions. At least one of the portions is movable relative to the other portion for clamping the cutting insert into the pocket.

The invention is further directed to a cutting tool, as summarized above, having a cutting insert held within the pocket by a clamping screw that is adapted to be inserted through the first portion of the tool body and threaded into a hole that extends transversely through the second portion of the tool body. Tightening the screw draws the two portions toward one another to clamp the tubular cutting insert in the pocket.

BRIEF DESCRIPTION OF THE DRAWINGS

Further features of the present invention, as well as the advantages derived therefrom, will become clear from the following detailed description made with reference to the drawings in which:

FIGS. 6A and 6B are perspective views of tubular cutting inserts with cylindrical external chamfers;

FIGS. 7A and 7B are perspective views of tubular cutting inserts with cylindrical internal and external chamfers;

FIGS. 8A–8C are perspective views of tubular cutting inserts with cylindrical internal chamfers;

FIG. 9 is a perspective view of a tubular cutting insert with an elliptical external chamfer;

FIG. 10 is a perspective view of a tubular cutting insert with an elliptical internal chamfer;

DETAILED DESCRIPTION OF THE INVENTION

Figure 1:
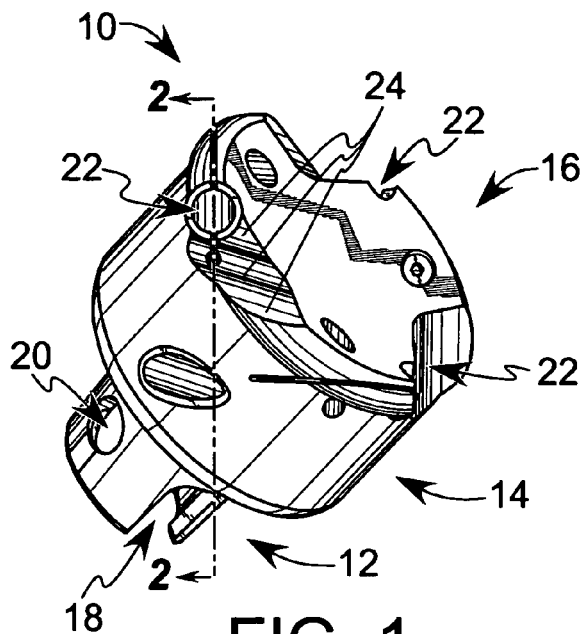
FIG. 1 is a perspective view of a cutting tool body.

With reference now to the drawings, wherein like numerals designate like components throughout all of the several figures, there is illustrated in FIG. 1 a tool body 10 having shank 12, which is adapted to be supported by a metal cutting machine, a generally cylindrical portion 14, and a working end 16, which is adapted to support one or more cutting inserts.

The shank 12 shown is a hollow taper shank, which is particularly suitable for high-speed operations. It includes a relief 18, which allows for expansion of the shank 12 when inserted into the cutting machine, and two holes 20 that are engaged by balls in the cutting machine to pull the shank 12 therein. It should be understood that the tool body 10 may employ other shanks and though the tool body 10 is well suitable for high-speed metal cutting operations, the tool body 10 may be suitable for other metal cutting operations.

The working end 16 has one or more pockets 22 therein for supporting the cutting inserts. Chip gashes 24 may be provided about the periphery of the working end 16 adjacent each pocket 22. The chip gashes 24 may be formed by scooping material from the working end of tool body 10 to enable the cutting edge of the cutting inserts to be exposed to a workpiece.

When producing the tool body 10, if the chip gashes 24 are cut into the tool body 10 prior to drilling the pockets 22, the chip gashes 24 each provide a surface suitable for drilling the pockets 22. The chip gashes 24 provide clearance for the cutting insert so size of the chip gashes 24 is generally dependent, at least in part, on the engagement of the cutting edge of the cutting insert with the workpiece and the number of pockets 22 in the tool body 10. The larger the chip gash 24, the better engagement the cutting edge of the cutting insert has with the workpiece. Otherwise, the chip gashes 24 are quite adjustable.

Figure 2:
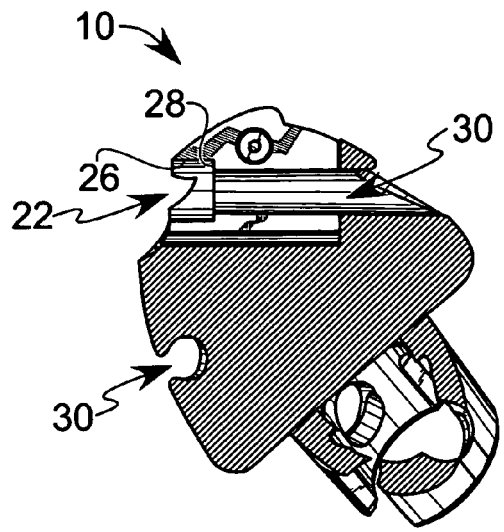
FIG. 2 is a cross-sectional view of the tool body taken along the line 2—2 in FIG. 1.

As illustrated in FIG. 2, the pockets 22 may be defined, at least in part, by a cylindrical wall 26 and a shoulder or seating surface 28 within the tool body 10. The seating surface 28 may extend radially inward from the cylindrical wall 26 to a passage 30. The passage 30 may be in the form of a hole that passes transversely through the tool body 10 with entrance and exit points.

Figure 3:
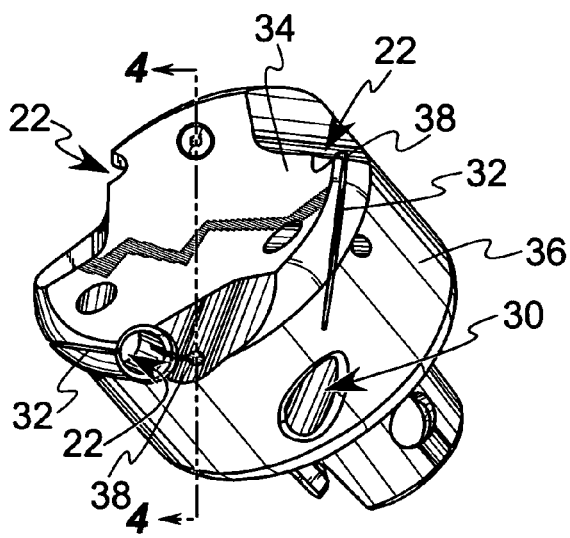
FIG. 3 is another perspective view of the tool body.
Figure 4:
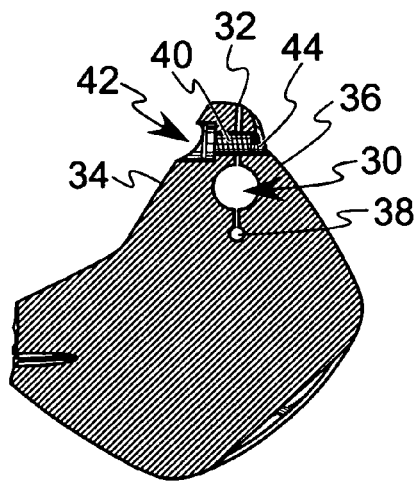
FIG. 4 is a cross-sectional view of the tool body taken along the line 4—4 in FIG. 3.

As illustrated in FIGS. 3 and 4, slots 32 are provided in the tool body 10 that traverse the pockets 22. The slots 32 may run the axial length of the pockets 22 and passages 30, or be provided in the area of the pockets 22, and may be parallel to the pockets 22 and/or passages 30. The slots 32 separate a part of the tool body 10 into the first and second portions 34, 36. The slots 32 may terminate in the tool body 10 along stress relief holes 38, which may extend the length of the slots 32. The stress relief holes 38 encourage movement of the first and second portions 34, 36 of the tool body 10 to produce a peripheral clamp, which may clamp substantially about the full periphery of a cutting insert.

Clamping action is effected by clamping screws 40, as shown in FIG. 4. Each clamping screw 40 is adapted to be inserted through the first portion 34 of the tool body 10, preferably through a counter-bored hole 42, and threaded into a hole 44 that extends transversely through a second portion 36 of the tool body 10. The counter-bored hole 42 is preferably larger than the head of the screw 40 to permit the head of the screw 40 to be recessed in the tool body 10. Tightening the screw 40 draws the two portions 34, 36 toward one another. The screw 40 is angled upwardly and outwardly, which is a most suitable orientation of the screw 40 under centrifugal forces of the tool body 10 during a metal cutting operation because the centrifugal forces function of pull the screw 40 into the threaded hole 44.

Figure 5:
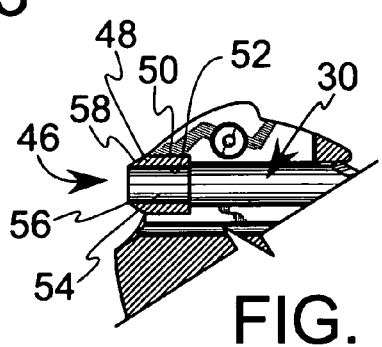
FIG. 5 is an enlarged view of the tool body shown in FIG. 4 with a tubular cutting insert therein.

The pockets 22 are adapted to support tubular cutting inserts 46, as shown in FIG. 5. Tightening the screw 40, as described above, holds the cutting insert 46 firmly in the pocket 22. The passage 30 through the tool body 10 cooperates with a hollow interior through the tubular cutting inserts 46 to form a flute. The passages 30 may be straight or could have other shapes and orientations, such as a helical orientation.

As clearly shown in FIG. 6A, the cutting inserts 46 may be formed at least in part by a cylindrical wall 48 having an outer surface 50 and an inner surface 52, bounding a hollow interior 54. A cylindrical cutting edge 56 is provides at one end of the cutting inserts 46. An external cylindrical chamfer 58 may extend from the outer surface 50 to the cylindrical cutting edge 56. The angle of the chamfer 58 may be dependent at least in part on the initial angle of the cylindrical cutting edge 56 (i.e., prior to shaping or honing the cylindrical cutting edge 56) and the ability of the chamfer 58 to direct chip flow through the passage 30, which will become more apparent upon reading the description below.

The axial length (i.e., horizontal distance when viewing FIG. 6A) of the tubular cutting insert 46 is mostly economically driven. The tubular cutting insert 46 may be sufficiently long to be clamped securely in the pocket 22 yet not so long as to waste material resources (i.e., carbide, metal cutting ceramic, cubic boron nitride, etc.). Ease of producing the tubular cutting insert 46 may also play a role in determining the length of the tubular cutting insert 46.

The cylindrical wall 48 of the tubular cutting insert 46 may be sufficiently thick to endure being clamped in the pocket 22 but sufficiently narrow to provide adequate or unobstructed chip flow through the hollow interior 54 of the tubular cutting insert 46. If the tubular cutting insert 46 is a carbide insert, clamping the tubular cutting insert 46 in the pocket 22 will take advantage of the compressive strength of the carbide.

The cutting inserts 46 may have a T-land 60 or other shape, and may be honed to make the cutting edge 56 blunt, so as not to be sharp to the point of being brittle. The width (the vertical distance when viewing FIG. 6A) of the T-land 60 may be dependent at least in part on the feed rate and cutting depth of the tool body 10. Moreover, the width of the T-land 60 is preferably sufficiently large to engage the seating surface 28 (shown in FIG. 5), unless the tubular cutting insert 46 has one cutting edge, like the cutting insert 46 shown.

As shown in FIG. 6B, the tubular cutting insert may be provided with one or more axial grooves, or other geometric features, as generally indicated at 62, in the inner surface of the cylindrical wall to encourage the chip flow through the hollow interior of the cutting insert.

As shown in FIGS. 7A and 7B, the tubular cutting insert may be provided with internal and external chamfers 64, 66 with a cylindrical cutting edge 68 therebetween.

As shown in FIGS. 8A through 8C, the tubular cutting insert may be provided with an internal chamfer 70 that extends from the inner surface of the cylindrical wall to the cutting edge 72. Moreover, the outer surface of the cylindrical wall of the tubular cutting insert may be provided with one or more geometric features, such as one or more radial annular grooves 74, as shown in FIG. 8A, one or more axial grooves 76, as shown in FIG. 8B, or some other suitable feature, such as a rough finish 78, as shown in FIG. 8C. The geometric features may cooperate with the pocket to aid in securely clamping the tubular cutting insert in the pocket. It should be noted that the pocket may be provided with geometric features that mate with the geometric features on the tubular cutting insert.

It should be noted that the tool body may be provided with pocket for supporting cutting inserts having other shapes, such as elliptical, square, octagonal, or hexagonal, or other polygonal shapes. For example, an elliptical cutting insert 80 with the external chamfer 82 shown in FIG. 9, and the elliptical cutting insert 84 with the internal chamfer 86 shown in FIG. 10. The narrow dimension of the elliptical cutting insert would be very suitable for rough cutting operations while the wide dimension of the elliptical cutting insert would be very suitable for finishing operations. The use of various shaped or oriented cutting inserts may dictate the need for cutting tools having pockets with different shapes or orientations. Alternatively, cutting inserts of differing shapes may be supported in different orientations by cartridges that may be clamped within a pocket, such as the cylindrical pocket 22 shown and described above.

Figure 11:
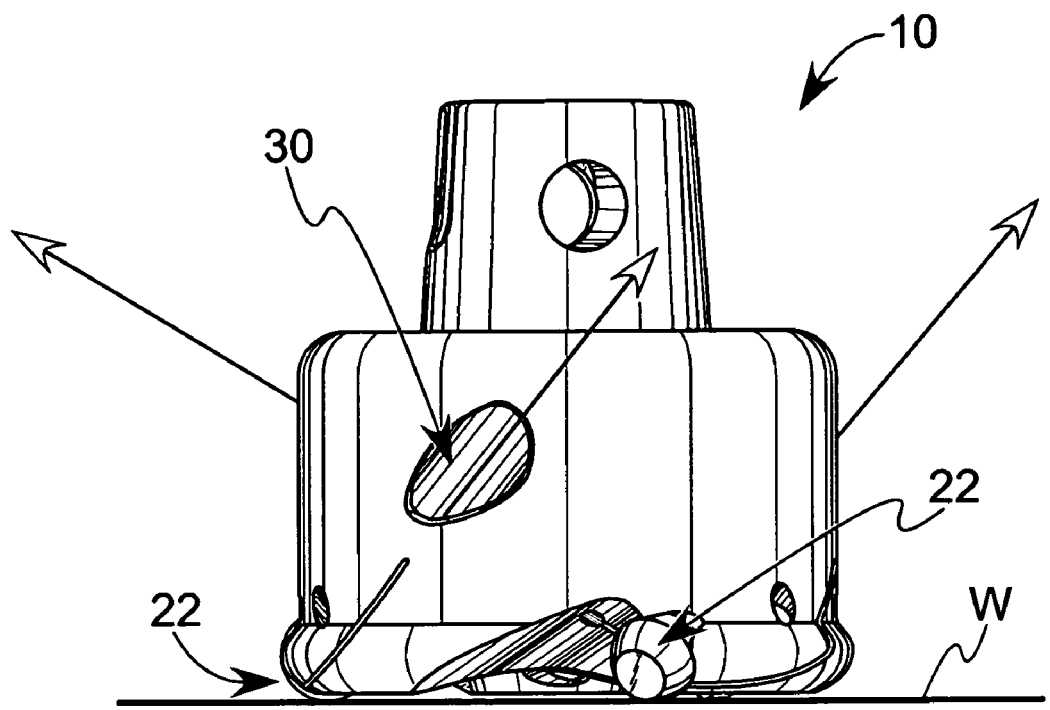
FIG. 11 is an environmental side elevational view of the cutting tool showing chip flow in an upward and outward direction.

The operation of the tool body 10 is best understood with reference to FIG. 11. The tool body 10 is supported in an adapter (not shown) for adapting the tool body 10 to the spindle of a metal cutting machine (also not shown). A tubular cutting insert, as described above, may be secured in the pocket 22 with the clamping screw 40, as set forth above. As the spindle turns, the tubular cutting insert engages a workpiece W, as shown in FIG. 11, to remove material from the surface of the workpiece W. As material is removed from the surface of the workpiece W, chips are discharged upwardly and outwardly through the passages 30 and away from the surface of the workpiece W. This avoids or reduces the risk that damage will occur to the finished workpiece W, which is generally encountered when using a conventional cutting tool, which deposits chips on the workpiece W and re-cuts the chips and damages the surface of the workpiece W. Directing the chips away from the workpiece W further eliminates or reduces to risk of re-cutting (i.e., cutting into chips on the surface of the workpiece W).

Figure 12:
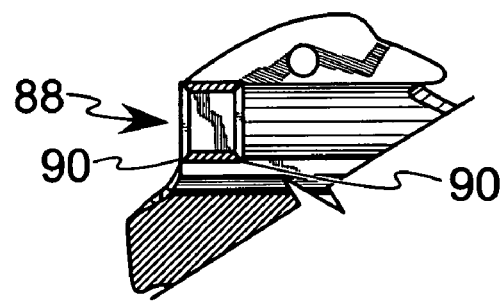
FIG. 12 is an enlarged partial cross-sectional view of the tool body supporting a tubular cutting insert having a cylindrical cutting edge at both ends.

It should be note that the invention is not intended to be limited to the tool body and tubular cutting insert shown and described above. For example, the clamping screw may be angled downwardly and inwardly, in the direction of the centrifugal forces of the tool body during a metal cutting operation. Moreover, a tubular cutting insert 88 may have a cylindrical cutting edge 90 at both ends, as shown in FIG. 12.

It should be appreciated that the tubular cutting inserts may be indexable, or adapted to be repositioned in the pockets. The number of indexable positions depends at least in part on the depth of the cut made by the tubular cutting insert. Geometric features, such as those described above, may aid in indexing the tubular cutting insert in discrete positions.

It should further be appreciated that the passages through the tool body may provide a smooth transition with the inner surface of the cylindrical wall of the tubular cutting insert, resulting in a continuous or uninterrupted and unobstructed passage for efficient and effective evacuation of chips from the workpiece W through the passages.

It should be noted that the bottom of the passages illustrated is directed neither radially or tangential to the periphery of the tool body but rather extends through the tool body, up and away from the cutting plane. In this way, the passages break out of the tool body without interfering with the pockets, the cutting insert, the screws, or holes.

Any documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting tool body that is adapted for use in metal cutting operations, the cutting tool body comprising:
   at least one pocket in the tool body for supporting a cutting insert, the pocket being defined, at least in part, by a cylindrical wall and a seating surface within the tool body;
   at least one passage through the tool body, the seating surface from the pocket extending radially inward from the cylindrical wall and intersecting the passage; and
   at least one slot in the tool body that traverses the pocket to separate a part of the tool body into first and second portions, at least one of which is movable relative to the other for clamping the cutting insert into the pocket.

2. A cutting tool that is adapted for use in milling operations, the cutting tool comprising:
   a tool body comprising:
   a working end with at least one pocket in the tool body, the pocket being defined, at least in part, by a cylindrical wall and a seating surface in the tool body; and
   a passage within the tool body, the seating surface extending radially inward from the cylindrical wall and intersecting the passage; and
   at least one slot in the tool body that traverses the pocket to separate a part of the tool body into first and second portions, wherein one portion is movable relative to the other portion; and
   a cutting insert held within the pocket by a clamping screw that is adapted to be inserted in a first hole through the first portion of the tool body and threaded into a second hole through the second portion of the tool body, whereby tightening the screw draws the two portions toward one another to clamp the tubular cutting insert in the pocket.

3. The cutting tool of claim 2, wherein the cutting insert is tubular and a flute is cooperatively formed by the passage through the tool body and the tubular cutting insert.

4. The cutting tool of claim 2, wherein the screw is angled upwardly and outwardly relative to the tool body.

5. The cutting tool of claim 2, wherein the screw has a head and the first hole in the tool body has a counter-bored portion that is sufficiently large to permit the head to be recessed in the tool body.

6. The cutting tool of claim 2, wherein the cutting insert is a tubular cutting insert and the passage through the tool body and the tubular cutting insert cooperatively form a flute and the slot runs the axial length of the pocket and the passage.

7. The cutting tool of claim 2, wherein the slot terminates in the tool body along a stress relief, which extends the length of the slot, the stress relief encouraging movement of the first and second portions of the tool body.

8. The cutting tool of claim 2, wherein the cutting insert has front edge that is defined by a cylindrical cutting edge.

9. The cutting tool of claim 8, wherein the cylindrical cutting edge has a T-land.

10. The cutting tool of claim 8, wherein the cutting insert is a tubular cutting insert having an external chamfer that extends from the cylindrical cutting edge to an outer surface of the tubular cutting insert.

11. The cutting tool of claim 10, further comprising an internal chamfer that extends from the cylindrical cutting edge to a hollow interior of the tubular cutting insert, the internal chamfer being adapted to direct chip flow through the passage for discharging chips from the surface of the workpiece though the passage.

12. The cutting tool of claim 8, wherein the cutting insert is a tubular cutting insert having an internal chamfer that extends from the cylindrical cutting edge to a hollow interior of the tubular cutting insert.

13. The cutting tool of claim 10, wherein the chamfer is adapted to direct chip flow through the passage for discharging chips from the surface of the workpiece though the passage.

14. The cutting tool of claim 2, wherein the cutting insert is a carbide insert.

15. The cutting tool of claim 2, wherein the cutting insert is a tubular cutting insert having a cylindrical wall with an inner surface that is provided with one or more geometric features that encourage the chip flow through the tubular cutting insert and the passage.

16. The cutting tool of claim 2, wherein the cutting insert is a tubular cutting insert having an outer surface that is provided with geometric features that cooperate with the pocket for clamping the tubular cutting insert securely in the pocket.

17. The cutting tool of claim 2, wherein the cutting insert is indexable.

18. The cutting tool of claim 2, wherein the cutting insert has a cutting edge at one end thereof.

19. The cutting tool of claim 2, wherein the cutting insert has opposing ends and a cutting edge at each end.

20. The cutting tool of claim 2, wherein the passage through the tool body is directed neither radially or tangential relative to the tool body but instead extends through the tool body up and away from the working end of the tool body and has opposing ends that break out of the tool body.

* * * * *